United States Patent [19]

Moberly

[11] Patent Number: 4,510,297

[45] Date of Patent: Apr. 9, 1985

[54] MELT CURING ARYLENE SULFIDE POLYMERS WITH OXYGEN

[76] Inventor: Charles W. Moberly, c/o Phillips Petroleum Company, Bartlesville, Okla. 74004

[21] Appl. No.: 570,108

[22] Filed: Jan. 12, 1984

[51] Int. Cl.³ .............................................. C08G 75/14
[52] U.S. Cl. .................................................... 525/537
[58] Field of Search .......................................... 525/537

[56] References Cited

U.S. PATENT DOCUMENTS 3,524,835  8/1970  Edmonds, Jr. et al. ............ 260/79.1
3,717,620  2/1973  Rohlfing ................................ 260/79
3,725,362  4/1973  Walker ................................. 525/537

Primary Examiner—Harold D. Anderson

[57] ABSTRACT

A method for treating arylene sulfide polymer in which the polymer is melted and the hot melt stirred in a vessel while contacting the polymer with oxygen for a time sufficient to obtain a product of increased viscosity. In an embodiment of the invention, the product of increased viscosity is transferred to an extruder where contact of the melted polymer with oxygen is continued further to increase the viscosity of the material.

8 Claims, No Drawings

MELT CURING ARYLENE SULFIDE POLYMERS WITH OXYGEN

BACKGROUND OF THE INVENTION

This invention relates to aromatic sulfide polymers, more particularly poly(arylene sulfide) resins, and most particularly poly(phenylene sulfide) resins. More particularly, it relates to the treatment of these polymers to decrease the melt flow in an aspect of the invention that relates to the curing of arylene sulfide polymers by contact with oxygen. In still another aspect of the invention, it relates to the production of polymer which is characterized by a low-melt flow which provides high temperature stability to objects that have been molded from the resin.

U.S. Pat. No. 3,524,835 discloses that the contact of poly(arylene sulfide) resin heated to an elevated temperature above the melting point of the resin in an oxidizing atmosphere produces an increase in the molecular weight, i.e., a decrease of the melt flow of the polymer thustreated. The present invention provides a method that sets this knowledge to practical use by providing means that facilitate the contact of the polymer with oxygen under treating conditions. Such a process makes possible the degree of ease of operation that can lead to commercialization.

It is, therefore, an object of this invention to provide means for the facilitation of curing the resin, i.e., lowering the melt flow of poly(arylene sulfide) resin. It is another object of this invention to provide a method by which cured poly(arylene sulfide) resin can be produced that has sufficiently decreased melt flow properties to withstand high temperatures. It is still another object of this invention to provide a method for overcoming the practical difficulties of treating a material of increasing viscosity.

Other aspects, objects, and the various advantages of this invention will become apparent upon reading the specification and the appended claims.

STATEMENT OF THE INVENTION

According to this invention, a method is provided for treating arylene sulfide polymers in which the polymer is melted in a vessel and the hot melt is stirred while contacting the melted polymer with oxygen for a time sufficient to decrease the melt flow to obtain a product of increased viscosity.

In an embodiment of the invention, the melted polymer is stirred in the vessel while contacting a blanket of oxygen-containing gas above the surface level of the melted polymer. In another embodiment of the invention, the melted polymer is stirred in the vessel while oxygen-containing gas is bubbled through the hot polymer until a product of desired melt flow is obtained.

In still another embodiment of the invention, the stirring of the hot polymer in contact with oxygen in the vessel is continued until a desired increase in viscosity is obtained. The polymer is then transferred to an extruder in which contacting of the melted polymer with oxygen is continued further to decrease the melt flow of the polymer.

The method for treating arylene sulfide polymer according to this invention is applicable to polymers produced by any of the known methods for producing poly(arylene sulfide) such as those set out in U.S. Pat. No. 3,354,129 in which polyhalo aromatic compounds, alkali metal sulfides, and organic amides are contacted at polymerization conditions, or alternatively, by such methods as set out in U.S. Pat. No. 3,919,177 in which 2-dihalobenzene, an alkali metal sulfide, an organic amide, and an alkali metal carboxylate are contacted at polymerization conditions, often together with an alkali metal hydroxide, such as sodium hydroxide, and/or a polyhalo aromatic compound, such as 1,2,4-trichlorobenzene. If desired, a lithium halide such as lithium chloride, can be used in place of the alkali metal carboxylate in the production of the polymer. If desired, water, which can be present with the reactant, can be removed by distillation prior to the polymerization reaction.

The poly(arylene sulfide)—usually, more specifically poly(phenylene sulfide)—which is treated by the process of this invention, will normally be particulate polymer that has been recovered from the reaction mixture and washed or subjected to treatment for removal of ash-forming contaminants. The invention is useful in treating polymers of any particle size ranging from the fine powder obtained by flashing the polar diluent from the reaction mixture or particles of greater size recovered from the reaction slurry by other methods. The particulate polymer is reduced to a hot melt within the vessel for the treatment process.

The source of oxygen for the treatment can be molecular oxygen, air, or a chemical compound such as peroxide that will release oxygen upon being heated.

For the process of this invention, any closed, pressure resistant stirred vessel that has agitation means capable of operation in a hot melt of the viscosity desired for the final product of this invention can be used. In the event that oxygen is bubbled through the vessel, there must be provision for admission of gas, preferably in the base of the vessel and, if the oxygen is accompanied by other gases inert to the contacting, there must be means for venting excess gas while maintaining desired pressure on the vessel.

In the operation of this invention, arylene sulfide polymer is introduced into a vessel equipped with an agitator and the temperature is raised sufficiently to melt the polymer and attain a temperature of about 550° to about 650° F. (288° to about 343° C.) in the polymer melt. Oxygen-containing gas can then be admitted above the liquid level of the polymer melt to form a blanket and the melt stirred until the desired viscosity increase is attained which indicates that the desired decrease in melt flow has been attained.

Alternatively, oxygen-containing gas can be bubbled through the melt as it is agitated which, again, will form an oxygen-containing blanket above the liquid level of the hot melt. Bubbling oxygen through the hot melt allows the desired increase in viscosity to be obtained more rapidly than contact with only the blanket of oxygen-containing gas above the liquid level.

Using either of the methods for contacting the hot melt with oxygen described above, the operation is continued until the desired increased viscosity is attained. There is always a possibility, however, that the viscosity will be increased beyond the range that the agitator can handle or even to the point that the polymer becomes a solid within the vessel and has to be chipped out. This problem can be eliminated by removing the treated polymer to an extruder for further treatment after the viscosity has increased, but only to a point that is within a desirable range.

The apparatus necessary for carrying out the extrusion portion of the invention is any extruder that can be operated at temperature and pressure levels to reduce resin particles to a hot melt, that can produce a screw feed that supplies mixing action over a residence time sufficient to assure sufficient contact between the melted resin and oxygen, and that has been adapted for the input of an oxygen-containing gas or an oxygen-producing chemical compound to provide contact of oxygen with the hot melt along at least a portion of the screw. Generally, a twin screw extruder is preferred because of the superior masticating action and the use of an extruder having means for supplying both heat and cooling to the barrel of the extruder is also preferred to control the temperature of the melted polymer reacting with the oxygen. The process of the invention should be easily carried out using ccommercially-available extrusion equipment that has been subjected to minor modification to provide inlet of the oxygen-containing contact material.

In the process of the invention, polymer melt from the stirred vessel is loaded into the extruder, and the temperature of the melt is again brought into the range of about 550 to about 650 F. (288° to about 343° C.). Gas containing oxygen is then admitted to the extruder using a pressure that is sufficient to force the gas into the melt.

In both the stirred vessel and the extruder, the oxygen-containing gas, which will usually be air or pure oxygen but which could be a mixture of molecular oxygen and inert gas, is admitted at a rate calculated at STP to provide a wt ratio of about 0.01 oxygen/1 polymer to about 1 oxygen/1 polymer, preferably in a range of about 0.05 oxygen/1 polymer to about 0.5 oxygen/1 polymer. In the event that an oxygen-emitting chemical compound is used as the oxygen source in the extruder, it can be added to the polymer as the polymer is admitted to the extruder. The amount of this material used would depend on the availability of oxygen from the compound and would be in an amount to make oxygen available in the same range of ratio of oxygen to polymer as stated above.

The extruder is operated at a sufficient time and temperature to allow the melted polymer to contact the oxygen to effect the desired amount of cure. The residence time required will be dependent upon the amount of oxygen present, the temperature employed, the configuration of the extruder and the screw speed parameters. The parameters for operating the extruder are within the skill of the art.

The practical advantage of the extrusion method of contacting oxygen with the hot polymer melt is the ease with which the equipment can handle the increased viscosity of the polymer as the melt flow is decreased in the treating process. Other equipment that has not been designed for the handling of highly viscous material can reach a point beyond which the polymer becomes too viscous for operation.

The treatment can be carried out with the presence of fillers added to the uncured arylene sulfide polymer. Glass fibers, glass beads, clay, talc, carbon black, titanium dioxide, or any of the other common solid fillers used with arylene sulfide polymer can be present in the extrusion mixture.

The following examples illustrate the process of this invention. The examples should be taken as illustrative and not restrictive.

A 2-liter, stainless steel reactor equipped with an anchor stirrer was used in the experimental curing treatment. It was electrically heated and had a bottom opening for introduction of gases, sampling and recovery of product. Provision was made for gases to exit the reactor. Stirring rate was 24 rpm. Previous and current experiments indicated little change in flow properties when the melt is heated under nitrogen. Ryton®, poly(phenylene sulfide) (PPS) from Phillips Petroleum Co., powder was charged to the open reactor, the reactor was closed and flushed by pressuring with nitrogen and venting. A nitrogen atmosphere was maintained over the PPS during heating. When 1000 gram charges were made, 800 grams was initially charged then 200 grams was added after melting because 800 grams of the low bulk density powder filled the reactor. When 300 gram charges were made additional polymer was not required. After all the charge was in and the reactor attained reaction temperature, the nitrogen was displaced with air and maintained at the desired pressure. A flow of air, measured by a rotameter at the exit of the reactor, was maintained. Air was passed over the surface of the melt or through the melt as indicated in tabulated results. When a large charge was made, the top flange of the reactor was heated in order to decrease the tendency of the molten polymer to climb the stirring shaft.

Product was sampled from the reactor by removing a rod which plugged the bottom reactor opening with pressure adjusted to atmospheric. Pressure was then applied to extrude a sample or the finished product. When cured to low melt flow, product extruded slowly, did not extrude completely and final recovery was made after cooling under nitrogen by chipping out from the open reactor. Product was generally extruded onto coarsely chopped dry ice. When product was only slightly cured, extrusion rate (small weight and long orifice) was measured and when substantially cured, melt flow (large weight and short orifice) was measured.

Some of the products were blended, compounded and mechanical properties were determined using standard methods.

In Table I experiments are tabulated in which molten PPS was stirred in the absence of air. In one case, a run was made in which vacuum was applied at 330° C. for 15 minutes. In this case, because of the lack of curing, it was necessary to determine the melt flow of the polymer by using ASTM D1238, Procedure B-Automatically Timed Flow Rate Measurement, modified by employing a temperature of 600° F. (315.6° C.), an orifice of 0.0825±0.0002 inch diameter and 1.250±0.002 inch length, and a total driving weight including the piston of 345 grams.

To avoid confusion with the term melt flow as determined in accordance with prescribed ASTM D1238 procedures, the result obtained with the modified procedure is termed Extrusion Rate. The result is given in g/10 minutes.

To illustrate, the Extrusion Rate of untreated PPS is about 55 g/10 min. The melt flow (later defined) ranges between about 2,000–6000 g/10 min. The extrusion rate of product was 49.6 g/10 min compared with 55.3 g/10 min for the original PPS.

TABLE I

Heat Treatment of PPS Melt in Absence of Air

| Run | Temp., °C. | Reactor Pressure | Atmosphere | Time, Min. | Extrusion Rate[a] g/10 min |
|---|---|---|---|---|---|
| 1 | 330 | 12 psia | Vacuum | 15 | 49.6 |
| 2 | 315 | 85 psia | Nitrogen | 180 | 46.7 |

[a]Extrusion Rate of untreated PPS = 55.3 g/10 min.

In the longer experiment under nitrogen the product did not cure appreciably. The Extrusion Rate was 46.7 g/10 min after 3 hours exposure to nitrogen. Thus, PPS is appreciably stable at these temperatures above its melting point in the absence of air.

In the presence of air, PPS cures to melt flows that cover a range of useful products. Melt flow is measured in accordance with ASTM D1238, Procedure B-Automatically Timed Flow Rate Measurement, modified by employing a temperature of 600° F. and a total driving weight of 5,000 grams. The melt flow results are expressed as g/10 min.

The melt flow of the initial PPS according to this test is in the 2,000–6000 g/10 min range. The data obtained where the PPS charge was 300 grams is shown in Table II.

The times to 50 melt flow in Table II are from extrapolation of plotted data. A comparison of 4 and 5 shows a shorter time required to reach 50 melt flow at the higher air flow even at a lower reactor pressure in view of the greater $O_2$/PPS weight ratio. A comparison of 5 and 6 indicates a faster reaction at 330° C. than at 315° C. at roughly similar $O_2$/PPS weight ratios. A comparison of 5 and 7 indicates the time to 50 melt flow is shorter when air was bubbled through the melt, increasing the contact between PPS and oxygen in the air, even at approximately similar $O_2$/PPS weight ratios.

Several experiments were made in which 1000 grams of PPS was charged with air bubbled through the melt in all cases at a flow rate of 10 SCFH. These data are recorded in Table III. In run 8, with the larger charge and no flange heater, the melt collected on the shaft so the melt exposed amounted to about 725 grams. The extrapolated time to 50 melt flow for the run 8 product was 118 minutes. The calculated $O_2$/PPS weight ratio, based on 725 grams of polymer melt was 0.24. With a flange heater employed, the amount of polymer melt exposed amounted to 1000 grams. After 120 minutes time the melt flow of the product was determined in run 9a to be about 1085. After 165 minutes treatment the results in run 9b indicated the product melt flow to be 2.8. Such a melt flow is too low to permit extrusion of the product through the bottom of the vessel with 165 psia air. In runs 10 and 11 products with 34.5 and 93 melt flow were made in 145 and 130 minutes, respectively.

TABLE II

Cure of PPS Melt in Air
300 g PPS in 2-liter reactor

| Run | Temp., °C. | Press., psia | Air SCFH | Contact Method | Time Min. | Melt Flow g/10 Min. | Calculated Weight Ratio $O_2$/PPS |
|---|---|---|---|---|---|---|---|
| 4 | 315 | 65 | 10 | surface | 60 | 1085 | 0.27 |
|   |     |    |    |         | 75 | 460  | 0.34 |
|   |     |    |    |         | 85 | 50   | 0.38 |
| 5 | 315 | 115 | 5 | surface | 45 | 1000[a] | 0.10 |
|   |     |     |   |         | 75 | 960     | 0.17 |
|   |     |     |   |         | 105 | 185    | 0.24 |
|   |     |     |   |         | 110 | 50     | 0.25 |
| 6 | 330 | 115 | 5 | surface | 45 | >>1000 | 0.10 |
|   |     |     |   |         | 65 | 960    | 0.15 |
|   |     |     |   |         | 85 | 145    | 0.19 |
|   |     |     |   |         | 87 | 50     | 0.20 |
| 7 | 315 | 115 | 5 | bubbled through | 45 | 780 | 0.10 |
|   |     |     |   |                 | 65 | 245 | 0.15 |
|   |     |     |   |                 | 73 | 50  | 0.16 |

[a]Melt flow is much greater than 1000. Actual figure could not be measured.

TABLE III

Cure of PPS Melt in Air
1000 g PPS
10 SCFH air flow bubbled through
315° C. and 115 psia

| Run | Flange Heated | Time in Minutes | Melt Flow | Calculated Weight Ratio $O_2$/PPS |
|---|---|---|---|---|
| 8 | no | 60 | 1315 | 0.11 |
|   |    | 90 | 650  | 0.17 |
|   |    | 110 | 170 | 0.20 |
|   |    | 118 | 50  | 0.24 |
| 9a | yes | 120 | 1085 | 0.16 |
| 9b |     | 165 | 2.8  | 0.22 |
| 10 | yes | 115 | 640  | 0.16 |
|    |     | 145 | 34.4 | 0.20 |
| 11 | yes | 130 | 93   | 0.18 |

TABLE IV

BLEND OF MELT-CURED PPS FOR EVALUATION

| Product of Run | Melt Flow | Weight, g |
|---|---|---|
| 8 | 170 | 400 |
| 10 | 34.4 | 898 |
| 11 | 93 | 920 |
| 12 (Blend 1) | 39 | 2218 |
| 8 | 170 | 470 |
| 7 | 245 | 165 |
| 6 | 145 | 164 |
| 5 | 185 | 180 |
| 13 (Blend 2) | 49 | 979 |

TABLE V

Properties of Glass-filled PPS Air-Cured by Different Methods

| | Run No. | | | |
|---|---|---|---|---|
| | 12a Commercial | 12b | 12c | 12d |
| | | Experimental | | |
| Cure method | Air Oven | Air Oven | Water Slurry | Invention Melt Process |
| Melt flow, g/10 min. | — | 65.6 | 13.5 | 29.5 |
| 700° F. weight loss, % | — | 0.7 | 0.7 | 0.7 |
| Ash, % | — | 42.3 | 43.4 | 41.6 |
| Flexural modulus, MPa[1] | 12970 | 12330 | 12390 | 12720 |
| Flexural strength, MPa[1] | 168 | 178 | 202 | 205 |
| Tensile break, MPa[2] | 106.6 | 88.5 | 117.2 | 100.7 |
| Elongation, %[2] | 2 | 2 | 4 | 3 |
| Izod Impact, notched, J/M[3] | 68.8 | 74.9 | 68.6 | 68.6 |
| Izod Impact, unnotched, J/M | 189.9 | 213.9 | 219.9 | 201.5 |
| Heat Deflection, °C., at 1820 kPa | 238 | 232 | 234 | 230 |

[1]ASTM D790
[2]ASTM D6383.
[3]ASTM D256
A blank signifies no determination was made A blend of some of the previously formed products was made and designated Blend 1 in Table IV. Blend 1 melt flow was determined to be 39, much lower than expected from the components. The reason for the discrepancy is not known. To increase the melt flow to the desired value of about 50, a blend of products of runs 5, 6, 7 and 8 was made and designated Blend 2. The melt flow of Blend 2 was determined to be 49.

Blend 2 was compounded with 40% fiber glass, injection molded, and the physical properties were compared with compounds from feedstocks prepared using other methods of curing as recorded in Table V. Physical properties of the glass-filled composition from invention melt-cured PPS (run 12d) compare favorably with other methods of cure as the results show. Melt cured PPS produced according to the inventive process is shown to be a viable process.

I claim:

1. A method for treating arylene sulfide polymer comprising stirring melted polymer in a vessel while contacting said polymer with oxygen for a time sufficient to decrease the melt flow to obtain a product of increased viscosity.

2. A method of claim 1 wherein oxygen is supplied in a gaseous blanket over said melted polymer during stirring.

3. A method of claim 1 wherein oxygen is bubbled through said melted polymer during stirring.

4. A method of claim 1, 2, or 3 wherein the oxygen supplied is chosen from air or molecular oxygen.

5. A method for treating arylene sulfide polymer comprising transferring a product of increased viscosity obtained by the method of claims 1, 2, or 3 to an extruder wherein contacting of said melted polymer with oxygen is continued further to decrease the melt flow and to obtain a product of increased viscosity.

6. A method of claim 5 wherein the oxygen supply is chosen from air or molecular oxygen.

7. A method of claim 1, 2, or 3 wherein the polymer contains filler.

8. A method of claim 5 wherein the polymer contains filler.

* * * * *